(12) United States Patent
Wang et al.

(10) Patent No.: US 12,718,190 B2
(45) Date of Patent: Aug. 25, 2026

(54) BOUND ENHANCED REINFORCEMENT LEARNING SYSTEM FOR DISTRIBUTION SUPPLY CHAIN MANAGEMENT

(71) Applicant: Hitachi, Ltd., Tokyo (JP)

(72) Inventors: Haiyan Wang, Fremont, CA (US); Atsuki Kiuchi, Santa Clara, CA (US); Hsiu-Khuern Tang, San Jose, CA (US); Chetan Gupta, Sunnyvale, CA (US); Ibrahim El-Shar, Tokyo (JP); Wenhuan Sun, Tokyo (JP)

(73) Assignee: HITACHI, LTD., Tokyo (JP)

( * ) Notice: Subject to any disclaimer, the term of this patent is extended or adjusted under 35 U.S.C. 154(b) by 394 days.

(21) Appl. No.: 18/105,593

(22) Filed: Feb. 3, 2023

(65) Prior Publication Data

US 2024/0265339 A1 Aug. 8, 2024

(51) Int. Cl.
*G06Q 10/087* (2023.01)
*G06Q 30/0202* (2023.01)

(52) U.S. Cl.
CPC ....... *G06Q 10/087* (2013.01); *G06Q 30/0202* (2013.01)

(58) Field of Classification Search
CPC .. G06Q 10/087; G06Q 30/0202; G06Q 10/08; G06Q 10/06; G06Q 30/0206;
(Continued)

(56) References Cited

U.S. PATENT DOCUMENTS 9,239,989 B2 1/2016 Bouqata et al.
2018/0046974 A1* 2/2018 Helander ............. G06Q 10/087
(Continued)

FOREIGN PATENT DOCUMENTS

AU 2003301919 B2 6/2008
WO 2001009803 A1 2/2001
WO 2004044734 A3 5/2024

OTHER PUBLICATIONS

J. J. Rao, K. K. Ravulapati, and T. K. Das, "A Simulation-Based Approach to Study Stochastic Inventory-Planning Games," International Journal of Systems Science, vol. 34, No. 12-13, pp. 717-730, 2003, doi: 10.1080/00207720310001640755.

(Continued)

*Primary Examiner* — Avia Salman
(74) *Attorney, Agent, or Firm* — PROCOPIO, CORY, HARGREAVES & SAVITCH LLP

(57) ABSTRACT

Example implementations described herein involve systems and methods for bound enhanced reinforcement learning systems for distribution supply chain management which can include initializing a replay buffer, a first state-action value function network having first random weights, and a second state-action value function network having second random weights; determining an action corresponding to an inventory ordering quantity at one or more facility in a multi-echelon supply chain network based on an (epsilon) ϵ-greedy exploration policy; executing the action in a simulated environment, and storing transition results in the replay buffer; calculating an upper bound and a lower bound of the optimal inventory costs; incorporating the upper bound and the lower bound with at least hyper-parameters $T_1$, $\tau_2$ in updating at least one of the first or the second state-action value function networks; and performing a gradient descent on the first state-action value function network based on the upper or the lower bound.

20 Claims, 7 Drawing Sheets

(58) Field of Classification Search
CPC ................. G06Q 30/02; G06Q 10/083; G06Q 10/06395; G06Q 10/0837; G06Q 20/389; G06Q 10/10; G06N 3/08; G06N 3/006; G06N 3/045; G06N 20/00; G06N 3/04; G06N 3/044; G06N 3/049; G06N 3/088; G06N 3/096; G06N 3/098; G06N 7/01; G06N 3/12; G05B 19/4099; G05B 19/4155; G05B 19/41865; G05B 19/4188; G05B 19/41885; G05B 2219/50391; G05B 19/418; G05B 13/0265; H04L 2209/56; H04L 9/50; H04L 67/02; H04L 67/1097; H04L 67/125; H04L 67/34; H04L 67/52; H04L 67/60; G06F 30/27; G06F 16/27; G06F 16/24537; G06F 16/24544; G06F 16/2455; G06F 16/2456; G06F 16/2462; G06F 16/2471; G06F 16/313; G06F 40/279; G06F 16/3344; G06F 16/248; G06F 18/24; G06F 40/205; G06F 40/211; G06F 16/316; G06F 18/214; G06F 40/216; G06F 40/232; G06F 16/24568; G06F 16/28; G06F 16/285; G06F 16/9038; G06F 17/16; G06F 9/5027; G06V 20/20; G06V 20/40; G06V 20/46; G06T 15/10; G06T 19/006
USPC ........................................................... 705/28
See application file for complete search history.

(56) References Cited

U.S. PATENT DOCUMENTS

2019/0073611 A1* 3/2019 Sahota .................. G06Q 10/08
2022/0180026 A1* 6/2022 Barat ..................... G06N 3/006
2023/0245156 A1* 8/2023 Cella ................. G06Q 30/0283 705/7.35

OTHER PUBLICATIONS

S. K. Chaharsooghi, J. Heydari, and S. H. Zegordi, "A reinforcement learning model for supply chain ordering management: An application to the beer game," Decision Support Systems, vol. 45, No. 4, pp. 949-959, Nov. 2008, doi: 10.1016/j.dss.2008.03.007, 11 pages.
K. K. Ravulapati, J. Rao, and T. K. Das, "A reinforcement learning approach to stochastic business games," IIE Transactions (Institute of Industrial Engineers), vol. 36, No. 4, pp. 373-385, Apr. 2004, doi: 10.1080/07408170490278698.
Z. Sui, A. Gosavi, and L. Lin, "A Reinforcement Learning Approach for Inventory Replenishment in Vendor-Managed Inventory Systems With Consignment Inventory," 2010, 10 pages.
T. van Tongeren, U. Kaymak, D. Naso, and E. van Asperen, "Q-Learning in a Competitive Supply Chain," 2007, 6 ages.
S. Yang and J. Zhang, "Adaptive inventory control and bullwhip effect analysis for supply chains with non-stationary demand," in Proceedings of the 2015 27th Chinese Control and Decision Conference, CCDC 2015, Jul. 2015, pp. 3903-3908. doi: 10.1109/CCDC.2015.7162605.
T. Stockheim, M. Schwind, and W. Koenig, "A Reinforcement Learning Approach for Supply Chain Management," 2003. [Online]. Available: http://www.wi-frankfurt.de, 15 pages.
A. Mortazavi, A. Arshadi Khamseh, and P. Azimi, "Designing of an intelligent self-adaptive model for supply chain ordering management system," Engineering Applications of Artificial Intelligence, vol. 37, pp. 207-220, Jan. 2015, doi: 10.1016/j.engappai.2014.09.004.
D. P. A., Carlos, R. M. T., Jairo, and F. A., Aldo, "Simulation-optimization using a reinforcement learning approach," in Proceedings—Winter Simulation Conference, 2008, pp. 1376-1383. doi: 10.1109/WSC.2008.4736213.
I. Giannoccaro and P. Pontrandolfo, "Inventory management in supply chains: a reinforcement learning approach," Int. J. Production Economics , 2002, 153-161.
Pontrandolfo et al., "Global Supply Chain Management: A Reinforcement Learning Approach", 2002, 28 pages.
I. H. Kwon, C. O. Kim, J. Jun, and J. H. Lee, "Case-based myopic reinforcement learning for satisfying target service level in supply chain," Expert Systems with Applications, vol. 35, No. 1-2, pp. 389-397, Jul. 2008, doi: 10.1016/j.eswa.2007.07.002.
Gijsbrechts et al., "Can Deep Reinforcement Learning Improve Inventory Management? Performance on Dual Sourcing, Lost Sales and Multi-Echelon Problems", 2019, 27 pages.
C. O. Kim, J. Jun, J. K. Baek, R. L. Smith, and Y. D. Kim, "Adaptive inventory control models for supply chain management," International Journal of Advanced Manufacturing Technology, vol. 26, No. 9-10, pp. 1184-1192, Oct. 2005, doi: 10.1007/s00170-004-2069-8.
C. O. Kim, I. H. Kwon, and J. G. Baek, "Asynchronous action-reward learning for nonstationary serial supply chain inventory control," Applied Intelligence, vol. 28, No. 1, pp. 1-16, 2008, doi: 10.1007/s10489-007-0038-2.
C. O. Kim, I. H. Kwon, and C. Kwak, "Multi-agent based distributed inventory control model," Expert Systems with Applications, vol. 37, No. 7, pp. 5186-5191, Jul. 2010, doi: 10.1016/j.eswa.2009.12.073.
J. Xu, J. Zhang, and Y. Liu, "An adaptive inventory control for a supply chain," in 2009 Chinese Control and Decision Conference, CCDC 2009, 2009, pp. 5714-5719. doi: 10.1109/CCDC.2009.5195218, 6 pages.
C. Kwak, J. S. Choi, C. O. Kim, and I. H. Kwon, "Situation reactive approach to Vendor Managed Inventory problem," Expert Systems with Applications, vol. 36, No. 5, pp. 9039-9045, Jul. 2009, doi: 10.1016/j.eswa.2008.12.018.
L. Kemmer and J. Read, "Reinforcement learning for supply chain optimization," European Workshop on Reinforcement Learning 14 (2018), 9 pages.
J. Li, P. Guo, and Z. Zuo, "Inventory control model for mobile supply chain management," in Proceedings—The 2008 International Conference on Embedded Software and Systems Symposia, ICESS Symposia, 2008, pp. 459-463. doi: 10.1109/ICESS.Symposia.2008.85, 5 pages.
M. H. F. Zarandi, S. V. Moosavi, and M. Zarinbal, "A fuzzy reinforcement learning algorithm for inventory control in supply chains," International Journal of Advanced Manufacturing Technology, vol. 65, No. 1-4, pp. 557-569, Mar. 2013, doi: 10.1007/s00170-012-4195-z.
Van Roy, B., Bertsekas, D. P., Lee, Y., & Tsitsiklis, J. N. (Dec. 1997), "A Neuro-Dynamic Programming Approach to Retailer Inventory Management", Proceedings of the 36th IEEE Conference on Decision and Control (vol. 4, pp. 4052-4057). IEEE.
A. Oroojlooyjadid, M. Nazari, L. v. Snyder, and M. Takáč, "A Deep Q-Network for the Beer Game: Deep Reinforcement Learning for Inventory Optimization," Manufacturing & Service Operations Management, Feb. 2021, doi: 10.1287/msom.2020.0939.
R. Wang, X. Gan, Q. Li, and X. Yan, "Solving a Joint Pricing and Inventory Control Problem for Perishables via Deep Reinforcement Learning," Complexity, vol. 2021, 2021, doi: 10.1155/2021/6643131, 17 pages.
H. Meisheri et al., "Scalable multi-product inventory control with lead time constraints using reinforcement learning," Neural Computing and Applications, 2021, doi: 10.1007/s00521-021-06129-w, 23 pages.
Z. Peng, Y. Zhang, Y. Feng, T. Zhang, Z. Wu, and H. Su, "Deep Reinforcement Learning Approach for Capacitated Supply Chain Optimization under Demand Uncertainty," 2019, 6 pages.
H. D. Perez, C. D. Hubbs, C. Li, and I. E. Grossmann, "Algorithmic approaches to inventory management optimization," Processes, vol. 9, No. 1, pp. 1-17, Jan. 2021, doi: 10.3390/pr9010102.
Z. Kegenbekov and I. Jackson, "Adaptive supply chain: Demand-supply synchronization using deep reinforcement learning," Algorithms, vol. 14, No. 8, Aug. 2021, doi: 10.3390/a14080240, 14 pages.
C. D. Hubbs, H. D. Perez, O. Sarwar, I. E. Grossmann, H. M. Stewart, and J. M. Wassick, "OR-Gym: A Reinforcement Learning

(56) References Cited

OTHER PUBLICATIONS

Library for Operations Research Problems", Journal on Computing, 2022, [Online]. Available: https://github.com/hubbs5/, 29 pages.

* cited by examiner

BOUND ENHANCED REINFORCEMENT LEARNING SYSTEM FOR DISTRIBUTION SUPPLY CHAIN MANAGEMENT

BACKGROUND

Field

The present disclosure is generally related to supply chain management systems, and more specifically, to systems and methods involving bound enhanced reinforcement learning systems for distribution supply chain management.

Related Art

Multi-stage or multi-echelon supply chains (SC) are commonly used due to globalization. Compared with single-echelon counterparts, multi-echelon inventory systems include additional supply chain stages or echelons that hold inventory, such as a warehouse between a factory and retailers. Maintaining optimal inventory levels along the whole supply chain that is robust to changing market and business environment is critical to an enterprise's bottom line and ensuring customer satisfaction.

Supply chains with multiple stages are highly complex systems and the inventory decisions made at different stages affect each other. In addition to the complex SC structure, there are many inherent uncertainties such as customer demand, transportation time from one location to another. As a result, determining optimal policies via mathematical models is intractable.

Traditional ways of managing these systems rely on heuristics that are often sub-optimal, typically problem dependent, and rely on restrictive assumptions. Recently, reinforcement learning (RL) has achieved significant progress in many fields with sequential decision making under uncertainty. Latest advances in deep reinforcement learning (DRL) have further extended the capability of RL and made it possible to generate deep neural network (DNN) based SC inventory policies with near-optimal performance. However, DRL training is usually time consuming.

In the field of RL, Q-Learning is a tabular algorithm that learns estimated optimal Q-values of state-action pairs and has been explored for supply chain management (SCM) optimizations.

In one example related art implementation includes modeled supply chain ordering management in a beer game, a game played in SCM classes to showcase the bullwhip effect, as a multi-agent RL environment and used Q-Learning to solve for a ordering policy for supply chain members.

In another example related art implementation includes Q-Learning adapted to solve non-cooperative decision-making problems in decentralized supply chain, such as an N-retailer and W-warehouse inventory planning problem. Other traditional RL methods used in SCM optimization include Semi-Markov average reward technique (SMART), cased-based myopic RL action-value, asynchronous action-reward, distributed supply chain control, action-reward, SARSA, REINFORCE, step-amount, and fuzzy RL.

In another example related art implementation is built upon the synergy between traditional RL methods and latest deep learning methods, and includes a variety of DRL algorithms to tackle complex SCM problems with large state and action spaces and variable environment conditions, including Deep Q-Learning (DQN), Actor-Critic (AC), Asynchronous Advantage Actor-Critic (A3C), policy gradient, and Proximal Policy Optimization (PPO).

In another example related art implementation includes specialized RL simulation environments for SCM optimization to provide a new tool for the operations research community. In addition to single product scenario, DRL methods also perform well in more complex SCM environment with multiple products and lead-time.

In another example related art implementation includes a method and system that searches for optimal supply chain policy to optimize inventory, which includes algorithm nodes to learn an optimal behavior from experience using RL.

In another example related art implementation includes a learning module achieved by one or more learning algorithms including RL with potential application in supply chain management to optimize warehouse inventories.

In another example related art implementation includes an agent engine system that generates policies to achieve business goals including inventory management using RL.

One of the challenges of RL based approaches is its computation cost for training. Many RL algorithms, especially DRL algorithms, require frequent interaction with the environment, which could become a bottleneck in scenarios where the simulations are expensive.

SUMMARY

Numerous related art implementations have tried to address adaptive inventory decision making and higher policy training efficiency. An issue with the related art is the lack of efficient deep reinforcement learning algorithms for supply chain management/inventory optimization.

Inventory issues may arise in a modern multi-echelon, divergent distribution supply chain that comprises a manufacturer, a distribution center, and one or more retailers, as shown for example in FIG. 1. The retailers (e.g., 106-1, 106-2, **106-*k*) are facing stochastic demands 108 from customers and any unmet demand may be assumed to be backordered. The lead time for both factory/manufacturer 102 to warehouse 104 and warehouse 104 to retailer (e.g., 106-1, 106-2, 106-*k***) transportation may be zero. The supply chain inventories of the warehouse and retailers are managed periodically, following a predefined, constant interval, which determines the control interval of the learned policy. As a natural constraint, the total orders placed by the retailers may not exceed the on-hand inventory at the warehouse. Using this setting, the one period cost of the entire supply chain system may be expressed as a function of the specific inventory stock levels prescribed by the policy.

The warehouse may be denoted by $\phi$ and the one or more retailers may be denoted by I, where a lead time of zero is assumed. The demand at the retailer i may be denoted by $d_{it}$ and the echelon demand (e.g., the total downstream demand) at the warehouse may be denoted by $d_{\phi t}=\Sigma_i d_{it}$. The state at each installation may be denoted by $x_{it}$ where the echelon inventory position (IP) at installation i at the beginning of period t.

As such, for retailer i, state is given by $x_{it}=\text{onhand}_{it}-\text{backlog}_{it}$, that is the difference between the inventory on hand and the backlogs at retailer i.

$$\text{Warehouse's state is given by: } x_{\phi t}=\text{onhand}_{\phi i}+\Sigma\text{onhand}_{it}-\Sigma\text{backog}_{it}$$

$$\text{Warehouse on-hand inventory: } \text{onhand}_{\phi i}=x_{\phi t}-\Sigma^{x}{}_{it}$$

Our actions are the order-up-to-levels:

$y_{it}$: echelon inventory position at installation i after receiving the replenishment quantity at period t.

Accordingly, the reorder quantities nay be given by $q_{it}=y_{it}-x_{it}$: replenishment quantity shipped to installation i at period t.

It may be assumed that the unit cost for replenishment at installation i at period t is $c_{it}$ replenishment at installation.

The holding and backordering costs at installation i are denoted by $h_{it}$ and $b_{it}$, respectively. The one period cost of the supply chain system is given by:

$$h_{\phi t}\left[x_{\phi t}-\sum_{i\in I}x_{it}+(y_{\phi t}-x_{\phi t})-\sum_{i\in I}y_{it}-x_{it}\right]+\sum_{i\in I}h_{it}\mathbb{E}\{[y_{it}-d_{it}]^{+}\}+\sum_{i\in I}b_{it}\mathbb{E}\{[d_{it}-y_{it}]^{+}\}$$

Denote $$L_{\phi t}(y_{\phi t})=h_{\phi t}y_{\phi t}$$

$$L_{it}(y_{it})=-h_{\phi t}y_{it}+h_{it}\mathbb{E}\{[y_{it}-d_{it}]^{+}\}+b_{it}\mathbb{E}\{[d_{it}-y_{it}]^{+}\}.$$

The objective of this is to develop a dynamic inventory management policy that set up the right stock levels at the warehouse and retailers to minimize the total discounted long-term system costs including replenishment cost, holding cost and backlog cost. This problem may be formulated as an infinite horizon discounted Markov Decision Problem (MDP). The Bellman optimality equation of this inventory optimization problem is as follows:

$$V_t(x_t)=\min_{yi}\sum_{i\in\mathcal{J}\cup\{\phi\}}c_{it}[y_{it}-x_{it}]+\sum_{i\in\mathcal{J}\cup\{\phi\}}L_{it}(y_{it})+\gamma\mathbb{E}\{V_{t+1}(y_t-d_t)\}$$

Subject to $$\sum_{i\in\mathcal{J}}y_{it}\le x_{\phi t}$$

$$\text{and }\ y_{it}\ge x_{it},\ \text{where } i\in\mathcal{J}\cup\{\phi\}.$$

To address the above issues, example implementations described herein involve a new algorithm, Bounds Enhanced Deep Q-Network, that leverages bounds derived using a Lagrangian relaxation technique on the original supply chain optimization problem to make DQN more efficient. The learned inventory policy using this novel algorithm can solve the aforementioned SC inventory optimization problem more efficiently and effectively. In essence, the bounds enhanced Deep Q-Network is a valuable variant of the DQN algorithm that uses Lagrangian relaxation technique to guide and expedite the DQN model training process.

The present disclosure involves a bound guided deep reinforcement learning method toward policy generation for SCM. The present disclosure addresses the lack of efficient deep reinforcement learning algorithms for supply chain management/inventory optimization in the related art.

Aspects of the present disclosure involve a new RL algorithm to achieve adaptive inventory decision making and higher policy training efficiency.

Aspects of the present disclosure involve a method of training a reinforcement learning algorithm for multi-echelon supply chain inventory levels, the method involving initializing a replay buffer, a first state-action value function network having first random weights, and a second state-action value function network having second random weights. The method further involves determining an action corresponding to an inventory ordering quantity at one or more facility in a multi-echelon supply chain network based on an (epsilon) ϵ-greedy exploration policy. The method further involves executing the action in a simulated environment, and storing transition results in the replay buffer, the transition results including a current state (Si) that corresponds to an inventory position level before ordering at each of the one or more facility in the multi-echelon supply chain network, an action taken ($a_t$) that corresponds to an inventory order quantity at each of the one or more facility in the multi-echelon supply chain network, or a cost ($c_t$). The cost of the system may be used as a scalar signal that an agent learns on. In some instances, reward signals may be defined as a negative of the cost. This cost is given by the supply chain inventory cost including an inventory ordering cost, an inventory holding cost, and a backorder cost for postponing a demand incurred at each of the one or more facility in the multi-echelon supply chain network, and a next state ($S_{t+1}$) that corresponds to an inventory position level at each of the one or more facility in the multi-echelon supply chain network after ordering and meeting the demand in the next time period. The method further involves calculating an upper bound of optimal inventory costs based on the $S_t$ by simulating a feasible policy. The method further involves calculating a lower bound of the optimal inventory costs based on the $S_t$ by Lagrangian relaxation. The method further involves incorporating the upper bound and the lower bound with at least hyper-parameters $\tau_1$, $\tau_2$ in updating at least one of the first state-action value function network or the second state-action value function network. The method further involves performing a gradient descent on the first state-action value function network based on the upper bound or the lower bound.

Aspects of the present disclosure involve a computer program storing instructions for training a reinforcement learning algorithm for multi-echelon supply chain inventory levels, the instructions involving initializing a replay buffer, a first state-action value function network having first random weights, and a second state-action value function network having second random weights. The instructions further involve determining an action corresponding to an inventory ordering quantity at one or more facility in a multi-echelon supply chain network based on an (epsilon) ϵ-greedy exploration policy. The instructions further involve executing the action in a simulated environment, and storing transition results in the replay buffer, the transition results including a current state ($S_t$) that corresponds to an inventory position level before ordering at each of the one or more facility in the multi-echelon supply chain network, an action taken ($a_t$) that corresponds to an inventory order quantity at each of the one or more facility in the multi-echelon supply chain network, a cost ($c_t$). The cost is given by the supply chain inventory cost including an inventory ordering cost, an inventory holding cost, and a backorder cost for postponing a demand incurred at each of the one or more facility in the multi-echelon supply chain network, and a next state ($S_{t+1}$) that corresponds to an inventory position level at each of the one or more facility in the multi-echelon supply chain network after ordering and meeting the demand in the next time period. The instructions further involve calculating an upper bound of optimal inventory costs based on the $S_t$ by simulating a feasible policy. The instructions further involve calculating a lower bound of the optimal inventory costs based on the St by Lagrangian relaxation. The instructions further involve incorporating the upper bound and the lower bound with at least hyper-parameters $\tau_1$, $\tau_2$ in updating at least one of the first state-action value function network or the second state-action value function network. The instructions further involve performing a gradient descent on the first state-action value function network based on the upper bound or the lower bound.

Aspects of the present disclosure involve a system for training a reinforcement learning algorithm for multi-echelon supply chain inventory levels, the system involving means for initializing a replay buffer, a first state-action value function network having first random weights, and a second state-action value function network having second random weights. The system further involves means for determining an action corresponding to an inventory ordering quantity at one or more facility in a multi-echelon supply chain network based on an (epsilon) $\epsilon$-greedy exploration policy. The system further involves means for executing the action in a simulated environment, and storing transition results in the replay buffer, the transition results including a current state ($S_t$) that corresponds to an inventory position level before ordering at each of the one or more facility in the multi-echelon supply chain network, an action taken ($a_t$) that corresponds to an inventory order quantity at each of the one or more facility in the multi-echelon supply chain network, or a cost ($c_t$). The cost is given by the supply chain inventory cost including an inventory ordering cost, an inventory holding cost, and a backorder cost for postponing a demand incurred at each of the one or more facility in the multi-echelon supply chain network, and a next state ($S_{t+1}$) that corresponds to an inventory position level at each of the one or more facility in the multi-echelon supply chain network after ordering and meeting the demand in the next time period. The system further involves means for calculating an upper bound of optimal inventory costs based on the $S_t$ by simulating a feasible policy. The system further involves means for calculating a lower bound of the optimal inventory costs based on the St. The system further involves means for incorporating the upper bound and the lower bound with at least hyper-parameters $\tau_1$, $\tau_2$ in updating at least one of the first state-action value function network or the second state-action value function network. The system further involves means for performing a gradient descent on the first state-action value function network based on the upper bound or the lower bound.

DETAILED DESCRIPTION

Figure 1:
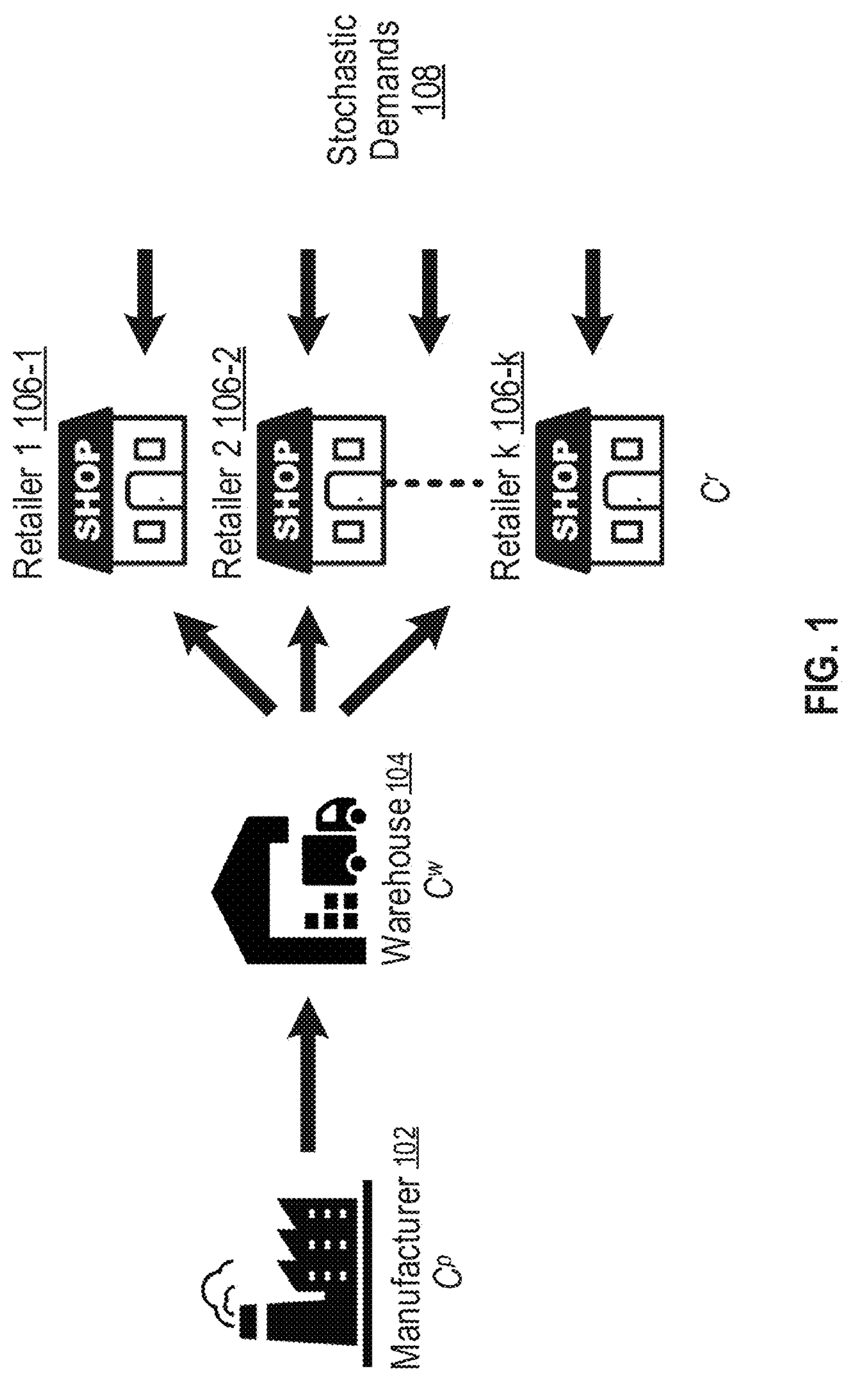
FIG. 1 illustrates an example of a divergent distribution supply chain, in accordance with an example implementation.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

The Bounds Enhanced Deep Q-Network (BEDQN) algorithm may utilize lower bounds of the optimal state-action values (Q values) to guide the optimization of DQN model by integrating a penalty term in the loss function in the training process that specifically penalizes low and high estimated Q values that violate the bounds. To calculate this lower bound on the system cost, a Lagrangian relaxation technique is applied to the original value function to relax the nonnegativity constraints for the retailers. During policy deployment, the learned policy is used as a greedy policy which scores/evaluates each potential stock level based on an observation of the current status of the supply chain and outputs the optimal one for each time period.

Figure 2:
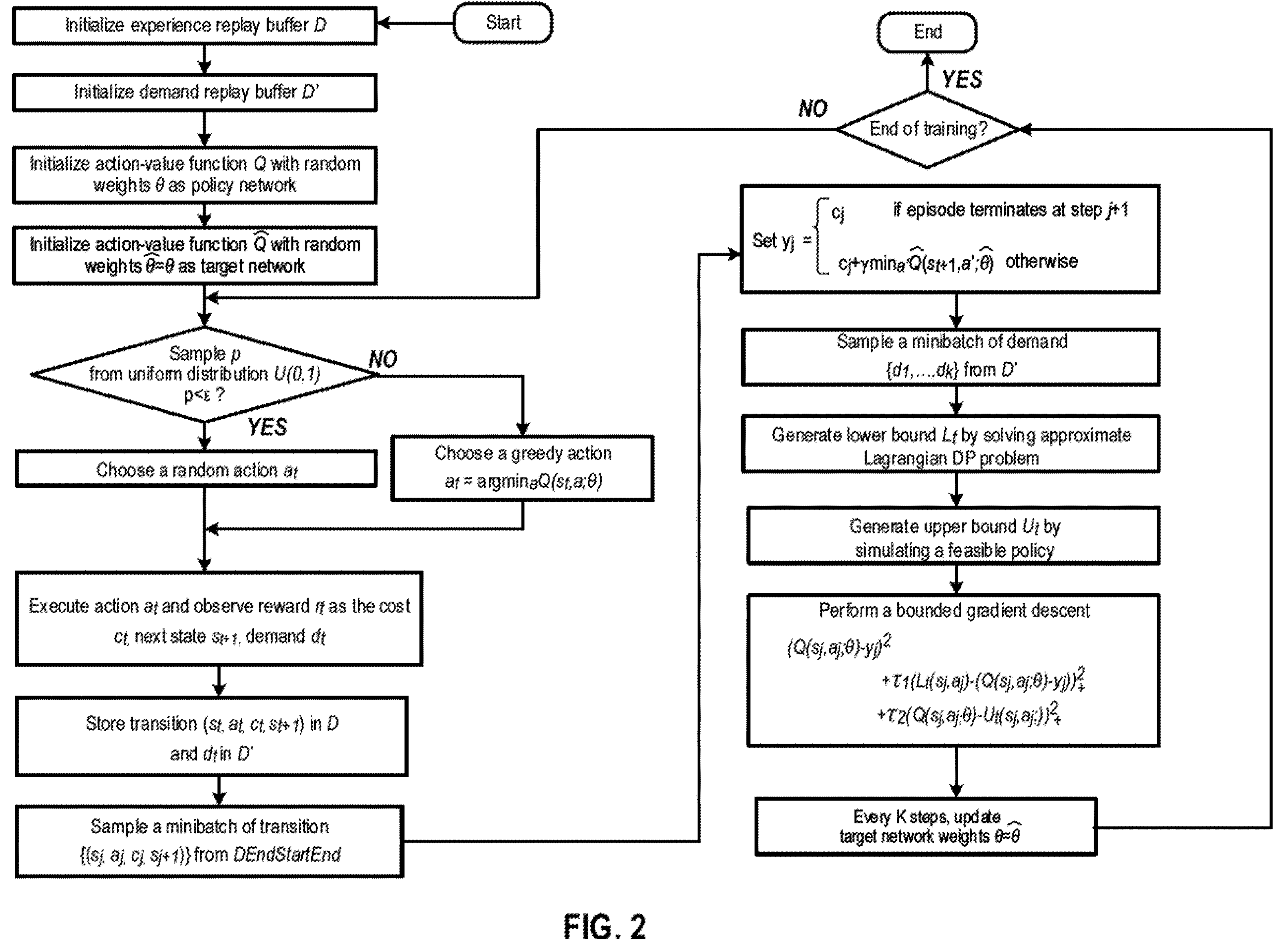
FIG. 2 illustrates an example of a flow diagram of a Bounds Enhanced Deep Q-Network (BEDQN) algorithm, in accordance with an example implementation.

FIG. 2 illustrates an example of a flow diagram of the BEDQN algorithm. The example of FIG. 2 may include the BEDQN algorithm during model training/policy learning. The algorithm starts with the initialization of an experience replay buffer (D) that stores the interaction between the learning agent and the simulated SC environment for training and of a demand replay buffer (D') that stores the corresponding customer demands for lower bound calculation. After that, a deep neural network is initialized with random weights as the policy network (Q) and a copy of it is made to form the target network ($\hat{Q}$). In each of the training step, an action is chosen using an epsilon-greedy ($\varepsilon$-greedy) policy. Namely, with probability $\varepsilon$, a random action may be chosen. Otherwise, an action that is greedy with respect to the Q-network is chosen. The chosen action $a_t$ may be executed in the simulated SC environment and an observation of the cost $c_t$, customer demand $d_t$ and the next state $s_{t+1}$. The transition tuple ($s_t$, $a_t$, $c_t$, $s_{t+1}$) is stored in D, and $d_t$ is stored in D'. A fix size subset, termed mini-batch, is then sampled from D, and the target value $$\left(y_t = c_t + \gamma \min_{a'} \hat{Q}(s_{t+1}, a', \hat{\theta})\right)$$

for each of the sampled record is calculated using the target network $\hat{Q}$.

A lower bound ($L_t$) for each of the optimal Q value for each of the sampled records may then be calculated by solving approximate Lagrangian Dynamic Programming problem using the sampled transition ($s_t$, $a_t$, $c_t$, $s_{t+1}$) and corresponding $d_t$. An upper bound ($U_t$) may then be calculated by simulating a feasible policy. For example, one feasible policy can be that each retailer orders a quantity that equals to the demand in the previous time period and the warehouse orders the total echelon demand in the previous period Finally, using the evaluation from the network $\hat{Q}$, a bounded gradient descent is performed using a combination of the loss function and the penalty terms that penalize out-of-boundQ-values. Importantly, the target network $\hat{Q}$ is updated to be an exact copy of the network Q periodically. Such training iterations are executed until a predefined training step count is reached.

The choice of the penalty term coefficients $\tau_1$ and $\tau_2$, the degrees to which the algorithm penalizes low Q values, may affect the efficiency and effectiveness of the training process. These parameters may be fine-tuned to suit the supply chain scenarios via parameter search in a combination of logarithmic and linear scales. For example, in some aspects, a coarse search of $\tau_1$ and $\tau_2$ may be conducted on a logarithmic scale (e.g., 0.01, 0.1, 1, 10, 100) to narrow down to a smaller range that produces good result (e.g., [1, 10]). In some aspects, a fine search may be subsequently conducted in this range on a linear scale to identify optimal $\tau_1$ and $\tau_2$ values.

Figure 3:
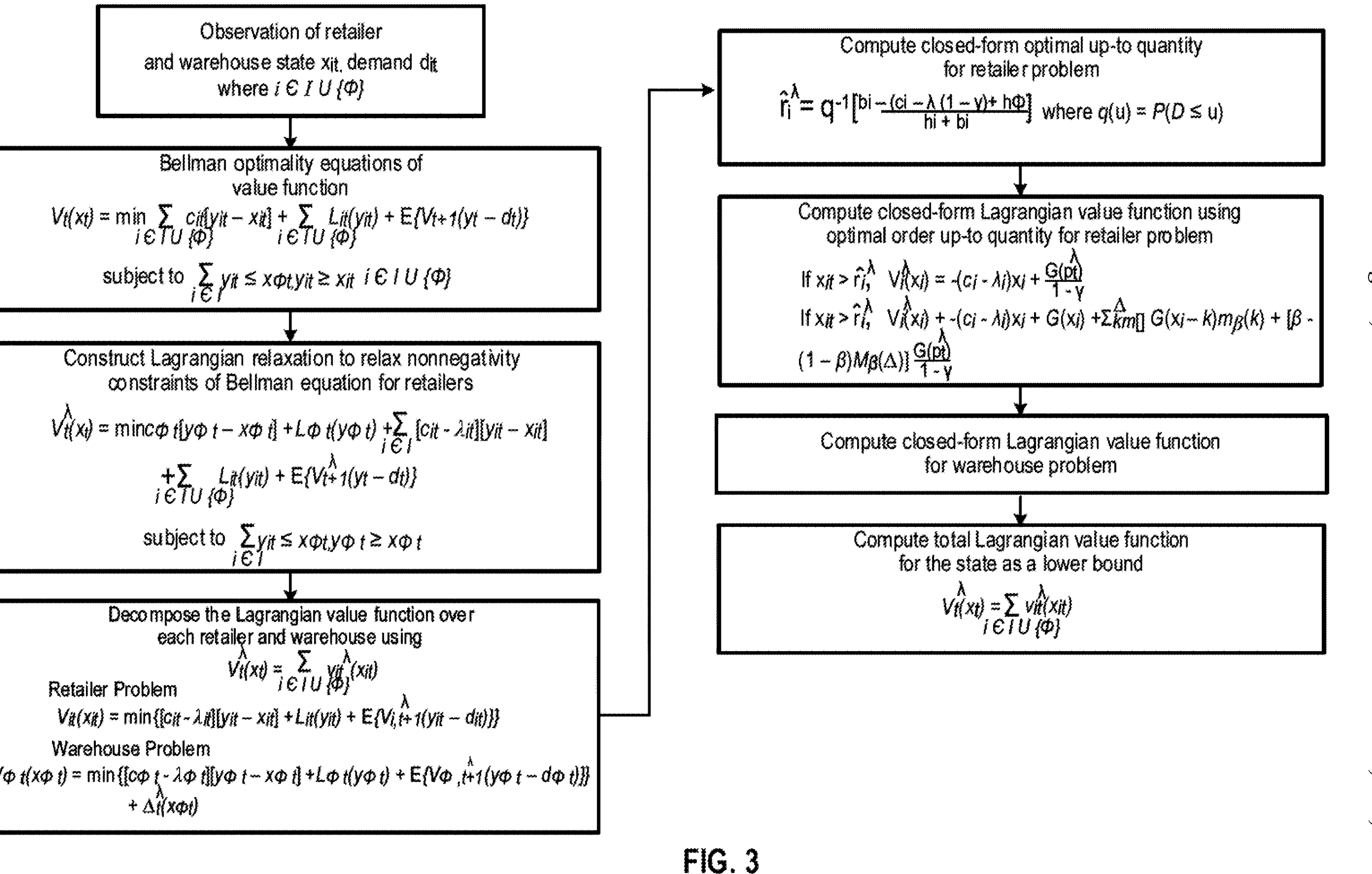
FIG. 3 illustrates an example of the Lagrangian relaxation algorithm flowchart, in accordance with an example implementation.

FIG. 3 illustrates an example of the Lagrangian relaxation algorithm flowchart used in BEDQN. The one period cost of the supply chain system, a summation of retailer and warehouse induced cost, is reformatted into Bellman optimality equation with non-negativity constraints on both the retailer and warehouse sides (target stock level at each installation should be no less than its current inventory position: $y_{it} \geq x_{it}$, $i \in I \cup \{\Phi\}$ where I and $\Phi$ stands for retailers and warehouse, respectively) and an additional warehouse constraint (warehouse inventory position should be no less than the combined retailer target stock level: $x_{\Phi,t} \geq \Sigma_{i \in I} y_{it} \in$).

A Lagrangian relaxation is applied by relaxing the non-negativity constraints for the retailers $y_{it} \geq x_{it}$, $i \in I \cup \{\Phi\}$ to obtain a new set of unconstrained Bellman equations for each retailer. After the decomposition of the Lagrangian function over each retailer and the warehouse, the optimal order up-to quantity for each retailer, $$\hat{r}_i^\lambda,$$

can be calculated analytically (in closed-form) based on the distribution of market demands or empirically based on observed market demands.

Using $$\hat{r}_i^\lambda,$$

the Lagrangian value function for each retailer is obtained in closed-form as a function of the current inventory position $x_i$ and optimal order up-to quantity $$\hat{r}_i^\lambda.$$

Figure 4:
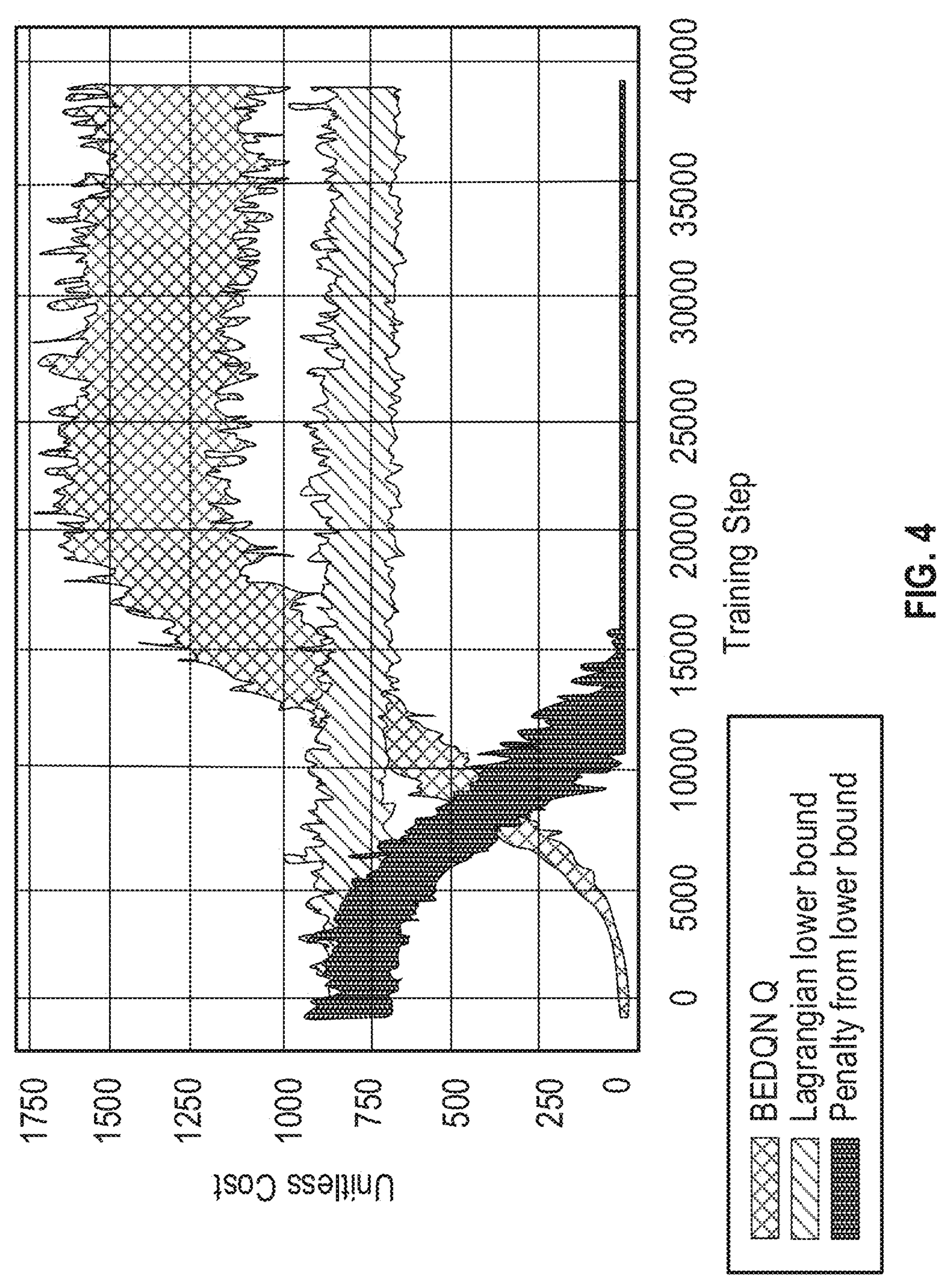
FIG. 4 illustrates an example of a comparison plot between a Lagrangian lower bound and policy network, in accordance with an example implementation.

The Lagrangian value function for the warehouse is computed by solving the warehouse relaxed Bellman equations using value iteration. The lower bound is then given by summing the warehouse and retailer value functions. Similar to $\tau_1$ and $\tau_2$, the choice of Lagrangian multiplier $\lambda$ may affect the optimization result. The optimal value of $\lambda$ can be identified using a similar procedure that searches a combination of logarithmic and linear scales values. A comparison plot between the Lagrangian lower bound and policy network as the training steps unfold is, shown for example, in FIG. 4. The example of FIG. 4 provides an example of a comparison of the estimated Q-value and Lagrangian lower bound during model training in terms of cost.

Figure 5:
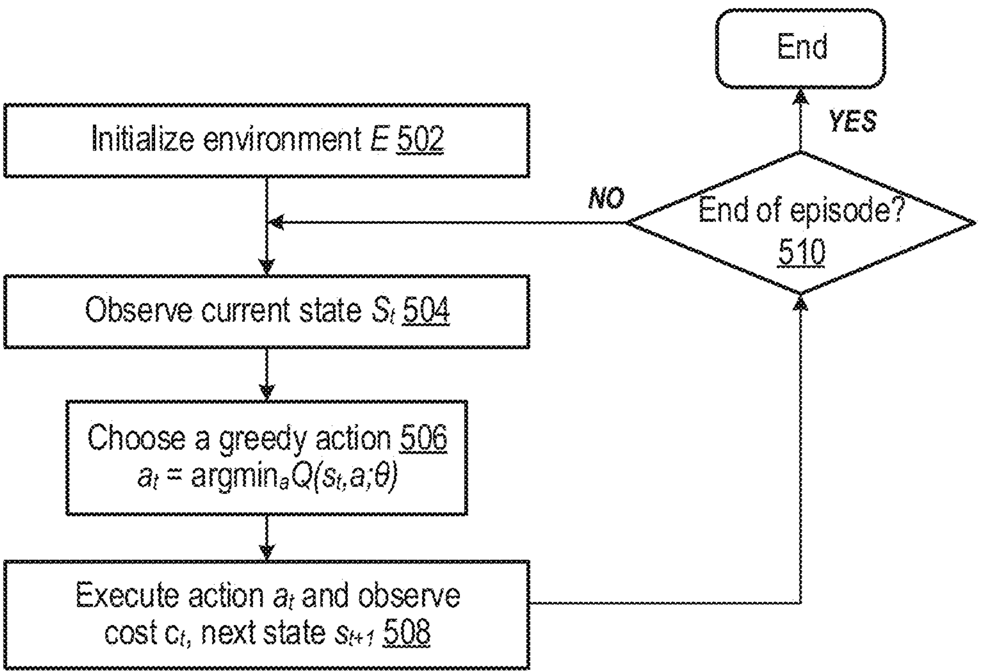
FIG. 5 illustrates an example of a Bounds Enhanced Deep Q-Network (BEDQN) algorithm deployment.
Figure 6:
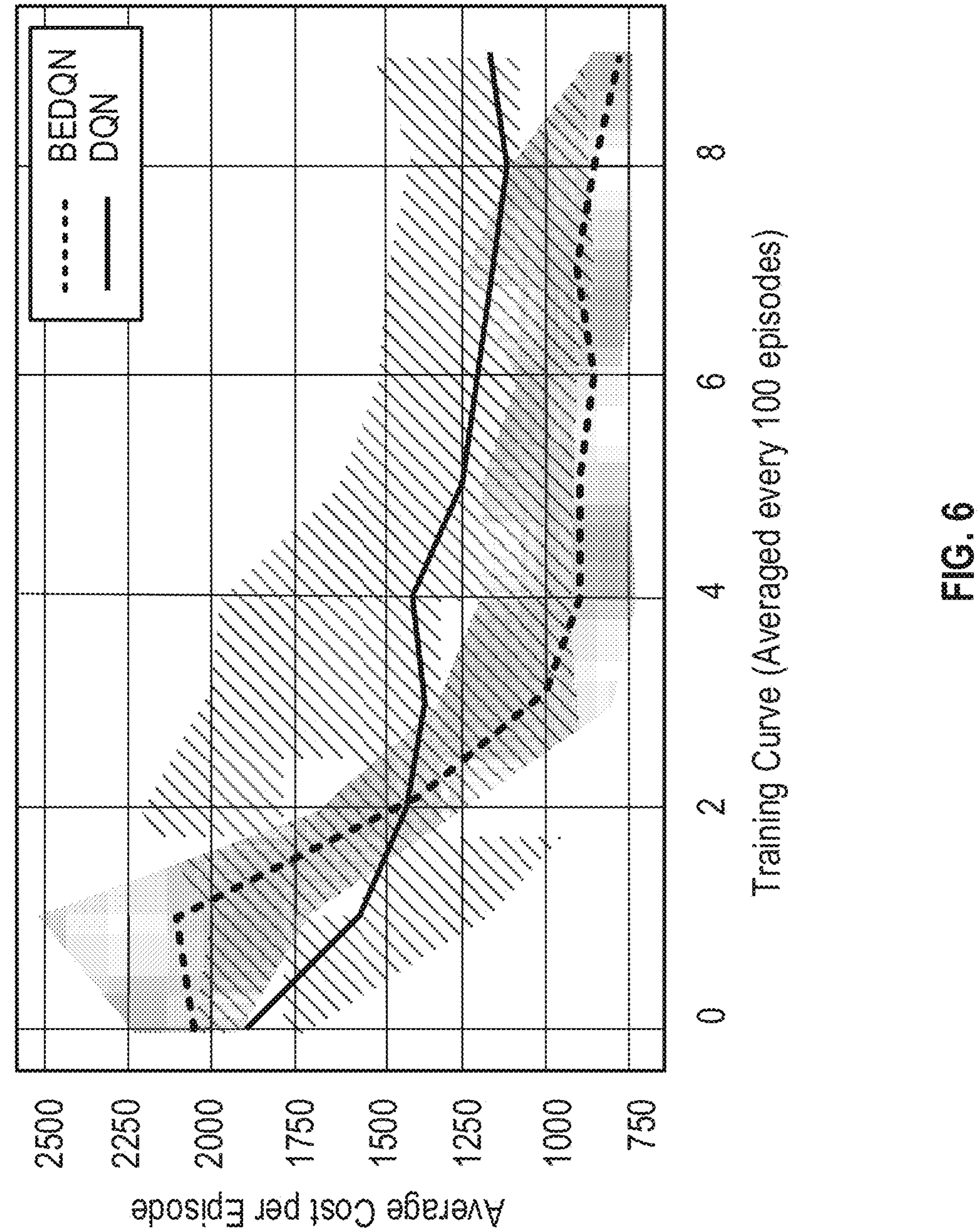
FIG. 6 illustrates an example of a training progress comparison between a DQN and the BEDQN algorithm, in accordance with an example implementation.

The deployment steps of the BEDQN algorithm are shown, for example, in FIG. 5. Essentially, in each period, given an observation of the SC simulation environment, a greedy action is taken based on the learned policy network from the BEDQN training procedure. For example, at 502, an environment is initialized and, at 504, a current state may be observed. At 506, a greedy action may be chosen. In some aspects, the greedy action may be based on the current state (e.g. $a_t = \text{argmin}_a Q(s_t, a; \theta)$. At 508, the action at may be executed and observe the cost ci, and the next state $s_{t+1}$. At 510, an end of the episode may be determined. If the episode has ended, then the deployment of the learned policy using LBDQN may end. If the episode has not ended, then the steps 504-510 may repeat, as necessary. A training progress comparison between the DQN and the BEDQN algorithm is shown, for example, in FIG. 6. The example of FIG. 6 provides an example of a training progress comparison between the DQN and the BEDQN algorithm in terms of average episode cost.

At least one advantage of the present disclosure is that the BEDQN algorithm enables adaptive supply chain inventory decision making instead of static inventory policies, which greatly increase supply chain efficiency and customer satisfaction. At least another advantage of the present disclosure is that the BEDQN algorithm may be configured to handle large, dynamic, multi-echelon supply chain system whereas traditional optimization methods can only solve SC problems with smaller scales or restrictive assumptions. Yet another advantage of the present disclosure is that the BEDQN algorithm enables efficient and effective DRL agent learning by exploiting the problem structure and applying Lagrangian relaxation technique. BEDQN may be applied to SC with different configurations, such as different number of retailers. The trained agent may guide supply chain decisions in real time.

Figure 7:
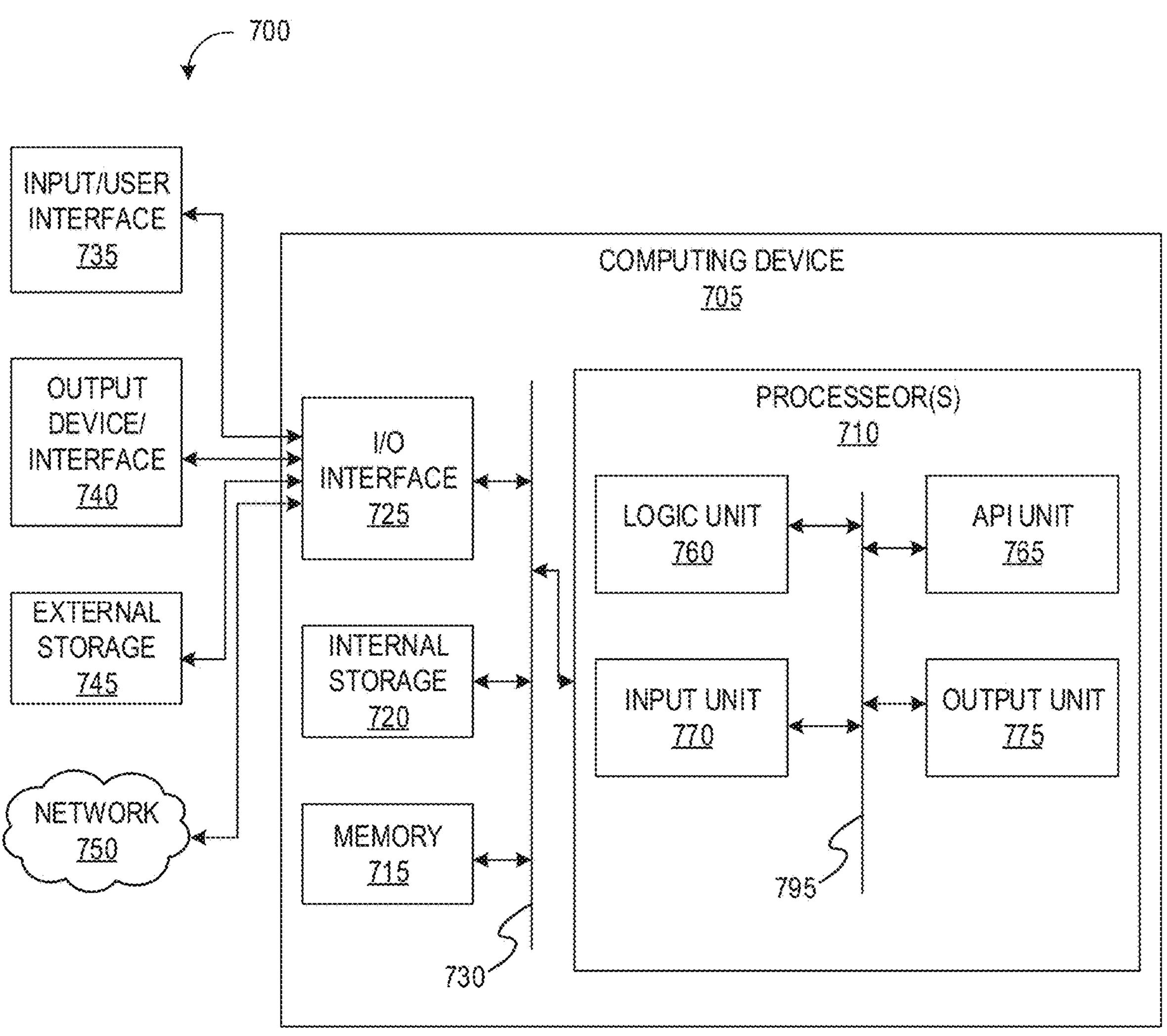
FIG. 7 illustrates an example computing environment with an example computer device suitable for use in some example implementations.

FIG. 7 illustrates an example computing environment with an example computer device suitable for use in some example implementations. The computing environment can be used to facilitate implementation of the architectures illustrated in FIGS. 1 to 6. Further, any of the example implementations described herein can be implemented based on the architectures, APIs, microservice systems, and so on as illustrated in FIGS. 1 to 6. Computer device 705 in computing environment 700 can include one or more processing units, cores, or processors 710, memory 715 (e.g., RAM, ROM, and/or the like), internal storage 720 (e.g., magnetic, optical, solid state storage, and/or organic), and/or I/O interface 725, any of which can be coupled on a communication mechanism or bus 730 for communicating information or embedded in the computer device 705. I/O interface 725 is also configured to receive images from cameras or provide images to projectors or displays, depending on the desired implementation.

Computer device 705 can be communicatively coupled to input/user interface 735 and output device/interface 740. Either one or both of input/user interface 735 and output device/interface 740 can be a wired or wireless interface and can be detachable. Input/user interface 735 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 740 may include a display, television, monitor, printer, speaker, braille, or the like. In some example implementations, input/user interface 735 and output device/interface 740 can be embedded with or physically coupled to the computer device 705. In other example implementations, other computer devices may function as or provide the functions of input/user interface 735 and output device/interface 740 for a computer device 705.

Examples of computer device 705 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 705 can be communicatively coupled (e.g., via I/O interface 725) to external storage 745 and network 750 for communicating with any number of networked components, devices, and systems, including one or more computer devices of the same or different configuration. Computer device 705 or any connected computer device can be functioning as, providing services of, or referred to as a server, client, thin server, general machine, special-purpose machine, or another label.

I/O interface 725 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 700. Network 750 can be any network or combination of networks (e.g., the Internet, local area network, wide area network, a telephonic network, a cellular network, satellite network, and the like).

Computer device 705 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 705 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 710 can execute under any operating system (OS) (not shown), in a native or virtual environment. One or more applications can be deployed that include logic unit 760, application programming interface (API) unit 765, input unit 770, output unit 775, and inter-unit communication mechanism 795 for the different units to communicate with each other, with the OS, and with other applications (not shown). The described units and elements can be varied in design, function, configuration, or implementation and are not limited to the descriptions provided. Processor(s) 710 can be in the form of hardware processors such as central processing units (CPUs) or in a combination of hardware and software units.

In some example implementations, when information or an execution instruction is received by API unit 765, it may be communicated to one or more other units (e.g., logic unit 760, input unit 770, output unit 775). In some instances, logic unit 760 may be configured to control the information flow among the units and direct the services provided by API unit 765, input unit 770, output unit 775, in some example implementations described above. For example, the flow of one or more processes or implementations may be controlled by logic unit 760 alone or in conjunction with API unit 765. The input unit 770 may be configured to obtain input for the calculations described in the example implementations, and the output unit 775 may be configured to provide output based on the calculations described in example implementations.

Processor(s) 710 can be configured to execute instructions for a method for training a reinforcement learning algorithm for multi-echelon supply chain inventory levels, the instructions involving initializing a replay buffer, a first state-action value function network having first random weights, and a second state-action value function network having second random weights; determining an action corresponding to an inventory ordering quantity at one or more facility in a multi-echelon supply chain network based on an (epsilon) $\epsilon$-greedy exploration policy; executing the action in a simulated environment, and storing transition results in the replay buffer, the transition results including a current state ($S_t$) that corresponds to an inventory position level before ordering at each of the one or more facility in the multi-echelon supply chain network, an action taken (at) that corresponds to an inventory order quantity at each of the one or more facility in the multi-echelon supply chain network, a reward ($r_t$) that corresponds to a negative of a supply chain inventory cost including an inventory ordering cost, an inventory holding cost, and a backorder cost for postponing a demand incurred at each of the one or more facility in the multi-echelon supply chain network, or a next state ($S_{t+1}$) that corresponds to an inventory position level at each of the one or more facility in the multi-echelon supply chain network after ordering and meeting the demand in a next time period; calculating an upper bound of optimal inventory costs based on the $S_t$ by simulating a feasible policy; calculating a lower bound of the optimal inventory costs based on the St; incorporating the upper bound and the lower bound with at least hyper-parameters $\tau_1$, $\tau_2$ in updating at least one of the first state-action value function network or the second state-action value function network; and performing a gradient descent on the first state-action value function network based on the upper bound or the lower bound as described, for example, in connection with FIGS. 1 to 6.

Processor(s) 710 can be configured to execute instructions for a method, wherein to calculate the lower bound of the optimal inventory costs, the method involving applying a Lagrangian relaxation technique to optimization constraints, wherein the optimization constraints corresponding to at least a total order quantity from one or more retailers being within an actual inventory at a warehouse or an order quantity at each facility being non-negative; and separating a multi-echelon supply chain inventory optimization problem into a plurality of independent single location inventory optimization problems, after applying the Lagrangian relaxation technique, wherein a sum of the optimal inventory costs of each of the plurality of independent single location inventory optimization problems serves as the lower bound of the optimal inventory costs as described, for example, in connection with FIGS. 2 to 6.

In any of the example implementations described herein, the Lagrangian relaxation technique generates a Lagrangian value function comprising state-action value estimation errors and penalties of state-action values that are outside calculated upper and lower bounds, wherein the lower bound is based on relaxed optimization constraints and separated independent single location inventory optimization problems, as described, for example, in connection with FIG. 3.

In any of the example implementations described herein, the gradient descent is applied to a penalized objective function when updating the first state-action value function network, wherein penalties comprise a first penalty coefficient $\tau_1$ applied when a state-action value is smaller than the lower bound and a second penalty coefficient $\tau_2$ is applied when the state-action value is greater than the upper bound, as described, for example, in connection with FIGS. 2 and 3.

In any of the example implementations described herein, values of the first penalty coefficient $\tau_1$ and the second penalty coefficient $\tau_2$ are determined using a coarse search based on a logarithmic scale, as described, for example, in FIGS. 2 and 3. The values of the first penalty coefficient $\tau_1$ and the second penalty coefficient $\tau_2$ are fine-tuned based on a granular linear scale to identify optimal values of the first penalty coefficient $\tau_1$ and the second penalty coefficient $\tau_2$, as described, for example, in connection with FIGS. 2 and 3.

In any of the example implementations described herein, the replay buffer comprises a first replay buffer and a second replay buffer, wherein the first replay buffer stores environmental data related to updating the first state-action value function network, wherein the second replay buffer stores historical demand information for use in calculating the lower bound, as described, for example, in connection with FIG. 2. A first subset of the environmental data of the first replay buffer and a second subset of the historical demand information of the second replay buffer are sampled for calculation of the lower bound and the upper bound, as described, for example, in connection with FIG. 2.

In any of the example implementations described herein, training of the reinforcement learning algorithm repeats for a set amount of repetitions, wherein the set amount of repetitions is preconfigured or configurable, as described, for example, in connection with FIGS. 2 and 5.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the techniques of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the techniques of the present application. Various aspects and/or components of the described example implementations may be used singly or in any combination. It is intended that the specification and example implementations be considered as examples only, with the true scope and spirit of the present application being indicated by the following claims.

What is claimed is:

1. A method for training a reinforcement learning algorithm comprising:

initializing a bifurcated memory structure including a first replay buffer configured to store environmental transition data, and a second replay buffer configured to store demand data, the bifurcated memory structure being structured to reduce a quantity of data subject to reinforcement learning analysis by enabling selective sampling from different data types during bound calculation;

initializing a first state-action value function network having first random weights, and a second state-action value function network having second random weights;

determining an action based on an exploration policy;

executing the action in a simulated environment and storing transition results in the bifurcated memory structure;

calculating an upper bound and a lower bound of optimal costs based on the stored transition results;

performing a penalty-constrained gradient descent on the first state-action value function network using a combination of a loss function and penalty terms that penalize state-action values violating the calculated bounds, the penalty-constrained gradient descent implementing a processing architecture to modify neural network weight updates by applying the penalty terms to reduce a computational training requirement compared to conventional neural network algorithms; and deploying the trained reinforcement learning algorithm for real-time control operations, wherein the trained reinforcement learning algorithm operates using the bifurcated memory structure to provide control decisions in real-time.

2. The method of claim 1, wherein calculating the lower bound of the optimal costs comprises:

applying a Lagrangian relaxation technique to optimization constraints, wherein the optimization constraints correspond to at least a total order quantity from one or more retailers being within an actual inventory at a warehouse or an order quantity at each facility being non-negative; and separating a multi-echelon supply chain inventory optimization problem into a plurality of independent single location inventory optimization problems, after applying the Lagrangian relaxation technique, wherein a sum of optimal costs of each of the plurality of independent single location inventory optimization problems serves as the lower bound of optimal costs.

3. The method of claim 2, wherein the Lagrangian relaxation technique generates a Lagrangian value function comprising state-action value estimation errors and penalties of state-action values that are outside calculated upper and lower bounds, wherein the lower bound is based on relaxed optimization constraints and separated independent single location inventory optimization problems.

4. The method of claim 1, wherein the penalty-constrained gradient descent is applied to a penalized objective function when updating the first state-action value function network, wherein the penalty terms comprise a first penalty coefficient $\tau_1$ applied to the lower bound and a second penalty coefficient $\tau_2$ applied to the upper bound.

5. The method of claim 1, wherein the penalty-constrained gradient descent is applied to a penalized objective function when updating the first state-action value function network, wherein the penalty terms comprise a first penalty coefficient $\tau_1$ applied when a first state-action value is smaller than the lower bound and a second penalty coefficient $\tau_2$ is applied when the first state-action value is greater than the upper bound.

6. The method of claim 4, wherein values of the first penalty coefficient $\tau_1$ and the second penalty coefficient $\tau_2$ are determined using a coarse search based on a logarithmic scale.

7. The method of claim 6, wherein the values of the first penalty coefficient $\tau_1$ and the second penalty coefficient ta are fine-tuned based on a granular linear scale to identify optimal values of the first penalty coefficient $\tau_1$ and the second penalty coefficient $\tau_2$.

8. The method of claim 1, wherein the bifurcated memory structure comprises the first replay buffer and the second replay buffer, wherein the first replay buffer stores environmental data related to updating the first state-action value function network, wherein the second replay buffer stores historical demand information for use in calculating the lower bound.

9. The method of claim 8, wherein a first subset of the environmental data of the first replay buffer and a second subset of the historical demand information of the second replay buffer are sampled for calculation of the lower bound and the upper bound.

10. The method of claim 1, wherein training of the reinforcement learning algorithm repeats for a set amount of repetitions, wherein the set amount of repetitions is preconfigured or configurable.

11. A method for training a reinforcement learning algorithm comprising:

initializing a bifurcated memory structure including a first replay buffer configured to store environmental transition data, and a second replay buffer configured to store demand data, the bifurcated memory structure being structured to reduce a quantity of data subject to reinforcement learning analysis by enabling selective sampling from different data types during bound calculation;

initializing a first state-action value function network having first random weights, and a second state-action value function network having second random weights;

determining an action based on an exploration policy;

executing the action in a simulated environment and storing transition results in the bifurcated memory structure;

calculating an upper bound and a lower bound of optimal costs based on the the stored transition results;

performing a penalty-constrained gradient descent on the first state-action value function network using a combination of a loss function and penalty terms that penalize state-action values violating the calculated bounds, the penalty-constrained gradient descent implementing a processing architecture to modify neural network weight updates by applying the penalty terms to reduce a computational training requirement compared to conventional neural network algorithms; and deploying the trained reinforcement learning algorithm for real-time control operations, wherein the trained reinforcement learning algorithm operates using the bifurcated memory structure to provide control decisions in real-time.

12. The non-transitory computer readable medium of claim 11, wherein to calculate the lower bound of the optimal costs, the instructions further comprising:

applying a Lagrangian relaxation technique to optimization constraints, wherein the optimization constraints corresponding to at least a total order quantity from one or more retailers being within an actual inventory at a warehouse or an order quantity at each facility being non-negative; and separating a multi-echelon supply chain inventory optimization problem into a plurality of independent single location inventory optimization problems, after applying the Lagrangian relaxation technique, wherein a sum of optimal costs of each of the plurality of independent single location inventory optimization problems serves as the lower bound of the optimal costs.

13. The non-transitory computer readable medium of claim 12, wherein the Lagrangian relaxation technique generates a Lagrangian value function comprising state-action value estimation errors and penalties of state-action values that are outside calculated upper and lower bounds, wherein the lower bound is based on relaxed optimization constraints and separated independent single location inventory optimization problems.

14. The non-transitory computer readable medium of claim 11, wherein the penalty-constrained gradient descent is applied to a penalized objective function when updating the first state-action value function network, wherein the penalty terms comprise a first penalty coefficient $\tau_1$ applied to the lower bound and a second penalty coefficient $\tau_2$ applied to the upper bound.

15. The non-transitory computer readable medium of claim 11, wherein the penalty-constrained gradient descent is applied to a penalized objective function when updating the first state-action value function network, wherein the penalty terms comprise a first penalty coefficient $\tau_1$ applied when a first state-action value is smaller than the lower bound and a second penalty coefficient r is applied when the first state-action value is greater than the upper bound.

16. The non-transitory computer readable medium of claim 14, wherein values of the first penalty coefficient $\tau_1$ and the second penalty coefficient $\tau_2$ are determined using a coarse search based on a logarithmic scale, wherein the values of the first penalty coefficient $\tau_1$ and the second penalty coefficient ta are fine-tuned based on a granular linear scale to identify optimal values of the first penalty coefficient ti and the second penalty coefficient $\tau_2$.

17. The non-transitory computer readable medium of claim 11, wherein the bifurcated memory structure comprises the first replay buffer and the second replay buffer, wherein the first replay buffer stores environmental data related to updating the first state-action value function network, wherein the second replay buffer stores historical demand information for use in calculating the lower bound.

18. The non-transitory computer readable medium of claim 17, wherein a first subset of the environmental data of the first replay buffer and a second subset of the historical demand information of the second replay buffer are sampled for calculation of the lower bound and the upper bound.

19. The non-transitory computer readable medium of claim 11, wherein the instructions repeat for a set amount of repetitions, wherein the set amount of repetitions is preconfigured or configurable.

20. A system comprising:

initialize a bifurcated memory structure including a first replay buffer configured to store environmental transition data, and a second replay buffer configured to store demand data, the bifurcated memory structure being structured to reduce a quantity of data subject to reinforcement learning analysis by enabling selective sampling from different data types during bound calculation;

initializing a first state-action value function network having first random weights, and a second state-action value function network having second random weights;

determining an action based on an exploration policy;

executing the action in a simulated environment and storing transition results in the bifurcated memory structure;

calculating an upper bound and a lower bound of optimal costs based on the the stored transition results;

perform a penalty-constrained gradient descent on the first state-action value function network using a combination of a loss function and penalty terms that penalize state-action values violating the calculated bounds, the penalty-constrained gradient descent implementing a processing architecture to modify neural network weight updates by applying the penalty terms to reduce a computational training requirement compared to conventional neural network algorithms; and deploy the trained reinforcement learning algorithm for real-time control operations, wherein the trained reinforcement learning algorithm operates using the bifurcated memory structure to provide control decisions in real-time.

* * * * *